United States Patent
Roulet et al.

(10) Patent No.: US 10,748,243 B2
(45) Date of Patent: Aug. 18, 2020

(54) IMAGE DISTORTION TRANSFORMATION METHOD AND APPARATUS

(71) Applicant: 6115187 Canada, Inc., Montreal (CA)

(72) Inventors: Patrice Roulet, Montreal (CA); Xiaojun Du, Montreal (CA); Jocelyn Parent, Montreal (CA); Pierre Konen, Saint-Bruno (CA); Simon Thibault, Quebec (CA); Pascale Nini, Montreal (CA); Valentin Bataille, Montreal (CA); Jhinseok Lee, Montreal (CA); Hu Zhang, Montreal (CA)

(73) Assignee: ImmerVision, Inc., Montreal, Quebec (CA)

( * ) Notice: Subject to any disclaimer, the term of this patent is extended or adjusted under 35 U.S.C. 154(b) by 0 days.

(21) Appl. No.: 16/225,236

(22) Filed: Dec. 19, 2018

(65) Prior Publication Data

US 2019/0122332 A1  Apr. 25, 2019

Related U.S. Application Data

(63) Continuation of application No. 15/434,529, filed on Feb. 16, 2017, now Pat. No. 10,204,398.

(Continued)

(51) Int. Cl.
 *G06K 9/00* (2006.01)
 *G06T 3/00* (2006.01)
(Continued)

(52) U.S. Cl.
 CPC ........ *G06T 3/0093* (2013.01); *G06F 3/04847* (2013.01); *G06T 5/002* (2013.01)

(58) Field of Classification Search
 None
 See application file for complete search history.

(56) References Cited

U.S. PATENT DOCUMENTS

| 3,953,111 A | 4/1976 | Fisher et al. |
| 5,880,896 A | 3/1999 | Ishii et al. |

(Continued)

FOREIGN PATENT DOCUMENTS

| CN | 104240236 A | 12/2014 |
| EP | 0695085 A1 | 1/1996 |

(Continued)

OTHER PUBLICATIONS

Simon Thibault et al., "Novel Hemispheric Image Formation: Concepts & Applications," Proc. of SPIE vol. 6994 699406-1 (2008).

(Continued)

*Primary Examiner* — Hadi Akhavannik
(74) *Attorney, Agent, or Firm* — Panitch Schwarze Belisario & Nadel LLP

(57) ABSTRACT

An image distortion transformation method for transforming an original image by an imager having an original distortion profile to a transformed image optimized for a distortion processing unit includes inputting the original image from the imager into the transformation unit, inputting an original image distortion profile into the original distortion profile memory of the transformation unit, and inputting a target distortion profile into the target distortion profile memory of the transformation unit. The target distortion profile is different from the original distortion profile. The method further includes transforming the original image into a transformed image by transforming the distortion profile of the original image from the original image distortion profile to the target image distortion profile, and outputting the transformed image from the transformation unit.

18 Claims, 8 Drawing Sheets

Related U.S. Application Data

(60) Provisional application No. 62/295,724, filed on Feb. 16, 2016.

(51) Int. Cl.
*G06F 3/0484* (2013.01)
*G06T 5/00* (2006.01)

(56) References Cited

U.S. PATENT DOCUMENTS

| | | |
|---|---|---|
| 6,031,670 A | 2/2000 | Inoue |
| 6,333,826 B1 | 12/2001 | Charles |
| 6,449,103 B1 | 9/2002 | Charles |
| 6,844,990 B2 | 1/2005 | Artonne et al. |
| 6,865,028 B2 | 3/2005 | Moustier et al. |
| 8,238,695 B1 | 8/2012 | Davey et al. |
| RE44,087 E | 3/2013 | Driscoll, Jr. et al. |
| 2003/0048959 A1 | 3/2003 | Peterson |
| 2004/0169724 A1 | 9/2004 | Ekpar |
| 2008/0072682 A1* | 3/2008 | Liu .................. G01F 1/28 73/756 |
| 2008/0143745 A1 | 6/2008 | Jin et al. |
| 2012/0082362 A1* | 4/2012 | Diem ............. A61B 5/0071 382/133 |
| 2012/0314065 A1 | 12/2012 | Parent et al. |
| 2015/0281507 A1 | 10/2015 | Konen et al. |

FOREIGN PATENT DOCUMENTS

| | | |
|---|---|---|
| EP | 1004915 A1 | 5/2000 |
| WO | 0042470 A1 | 7/2000 |

OTHER PUBLICATIONS

Int'l Search Report and Written Opinion dated Jun. 19, 2017 in Int'l Application No. PCT/IB2017/000119.
International Preliminary Report on Patentability dated Aug. 30, 2018 in International Application No. PCT/IB2017/000119.

\* cited by examiner

IMAGE DISTORTION TRANSFORMATION METHOD AND APPARATUS

CROSS-REFERENCE TO RELATED APPLICATIONS

This application is a continuation of U.S. patent application Ser. No. 15/434,529, filed Feb. 16, 2017, entitled "Image Distortion Transformation Method and Apparatus," currently pending, which claims the benefit of U.S. Provisional Patent Application No. 62/295,724, filed Feb. 16, 2016, entitled "Image Distortion Transformation Method and Apparatus," the entire contents of all of which are incorporated by reference herein.

BACKGROUND OF THE INVENTION

Embodiments of the present invention relate to an image or imager distortion processing method and apparatus to transform an image, optimizing it for a distortion processing algorithm (e.g., dewarping algorithm). Using the same method, embodiments of the invention allow magnification of some areas of interest in the image or imager field of view, optimizing the storage, transmission, resolution, or display of the content.

A two-dimensional (2D) image is created by an imager, such as a narrow angle imager, panoramic imager, wide-angle optical system, fisheye optical system, panomorph optical system, or even image stitching from multiple narrow-angle images or image stitching from multiples panoramic images. No matter what kind of imager is used, the image often contains optical distortion. This behavior is caused by remapping of the three-dimensional (3D) environment to a 2D plane. As the result, contents in the image are deformed, and the exact distortion profile depends on the imager parameters. Usually, the distortion is much more obvious with panoramic imagers.

To properly display an image without distortion, or feed the correct image to any image processing algorithm, the distortion in panoramic image has to be processed, as in U.S. Pat. No. RE 44,087 E for linear distortion or U.S. Pat. Nos. 6,844,990 B2 and 6,865,028 B2 for custom symmetric and custom asymmetric distortion, respectively. These existing distortion processing algorithms or dewarping algorithms (actions to correct, remove, process or modify the distortion of an image) are implemented by software or hardware on different platforms, such as a computer, smartphone, tablet, System on Chip (SoC), or the like. As an example, IPIX plug-in for Milestone system is a dewarping software to correct distortion of fisheye lenses. Some dewarping algorithms use only a linear distribution function to correct different distortion profiles from different panoramic imagers. In this case, because the linear correction function used does not match the real distortion profile of the panoramic image or imager, some distortion remains in the images after dewarping. To properly correct the distortion, the dewarping algorithm has to use the distribution function (distortion profile), considering the distortion profile of the panoramic imager and the application user experience. This means that the departure between the distortion profile and the dewarping algorithm distribution function has to be controlled. One approach could be to input the distortion profile as a mathematical function to the distortion processing algorithm to correct a panoramic image. However this approach cannot be used in all situations, for example, but not limited to, sometimes the distortion profile is confidential or not present in the image processing unit running the distortion processing algorithm. Furthermore, the distortion profile for a new imager cannot be easily added or updated in existing software or in a hardware processing algorithm. This requires a software update, firmware update, or hardware modification (ASIC modification, for example).

ImmerVision Enables 2.0 algorithms correct the distortion of panomorph images or imagers. The libraries including the algorithms contain some distortion profiles (or distribution functions) corresponding to the panomorph imagers or panomorph lenses available at the time of the algorithm release in the image processing units (library, ASIC, FPGA, or the like). If the distortion profile of a panoramic image or imager is in this list of pre-recorded distortion profiles, a user only needs to input a distortion profile reference number and the processing algorithm will use the proper existing distortion profile. For example, at least some embodiments of U.S. Patent Application US 2015/0281507 A1 use a marker on the image to record this distortion profile reference number or the distortion profile itself. In the embodiments where only the reference number of the distortion profile is marked, the distortion processing unit can read the reference number from the marker and automatically use the corresponding distortion profile. Compared with transferring the whole distortion profile to the distortion processing algorithm, this way is more efficient. In some cases, this approach cannot be used since the distortion profile is not present in the algorithm, and therefore the algorithm is not designed to support this new type of distortion profile. An example of this case is a panoramic image with a new distortion profile which is created by, for example, but not limited to, a new wide-angle, fisheye, or panomorph lens, or new image processing algorithm. For this image, the distortion processing unit has to be updated with the new distortion profile or a completely new algorithm before the distortion processing unit can correct, remove, process or modify the distortion of the panoramic image or imager. In some situations, algorithm updates cannot be done easily, especially when the distortion processing algorithm is implemented on hardware. This limits the application of distortion processing algorithms for different panoramic images or imagers.

Due to the big data size of images or videos, the optimization of image storage or transmission resource is always preferred. An optimization approach is to reduce image or video size. For panoramic image or wide-angle images, U.S. Pat. No. 8,238,695 proposes to crop a part of image data for a virtual camera from the whole image to reduce image data size. This solution sacrifices the image data outside of the virtual camera area, and it can only be used for the use case of a virtual camera. The saved or transmitted image only contains image data for the virtual camera, and other image data from the rest of the field of view is lost. This does not work for the application of whole panoramic images. Another alternative, to keep the whole panoramic field of view, is to instead uniformly scale down the whole image to a lower resolution and to decrease the image size. However, this scaling is the same for the whole image, and the image quality is degraded in the whole image. One optimized approach would be to use higher resolution in important image areas and lower resolution in other image areas, meaning different scaling ratios are applied for different areas of the image. In this way, more pixels would be used to emphasize important areas when the image size is decreased. This non-linear scaling creates a new distortion in the generated image. This new distortion is different from the original distortion of the original panoramic image. So the distortion in the original panoramic image cannot be used for processing this optimized image.

U.S. Pat. No. 6,865,028 proposes to project non-disk shape panoramic image on a rectangular image sensor. This includes, but is not limited to, elliptical images. Compared with a circular image, the elliptical image occupies more pixels on the rectangular image sensor and there are therefore fewer black pixels in the output image. In this way, out of the total file size for the image, a larger fraction is used by useful image contents compared to useless black content. The resulting image has higher effective resolution. For image storage and transmission, this elliptical panoramic image containing fewer black pixels is more efficient than a circular panoramic image. However, U.S. Pat. No. 6,865,028 only suggests optical means to implement this method of creating panomorph optical system, and the distortion profile is unique for each panomorph optical system. In addition, the distortion profile is fixed after the panomorph optical system is produced. The distortion profile can only be modified by designing new lenses, so an existing optical lens cannot be modified and cannot dynamically change the distortion depending on applications.

Dynamically changing the distortion has been proposed in the past in U.S. Patent Publication No. 2012/0314065 A1. However, this invention changes the distortion in real-time using a hardware optical system consisting of a deformable optical surface as a deformable mirror. This construction is complex and cannot be used in existing panoramic imagers to dynamically modify the areas of interest.

Since 2006, the Panomorph Geometrical Model Simulator (PGMS) software, developed by ImmerVision, simulates distortions in images to analyze image distortion effects. The Panomorph Geometrical Model was described in the paper "Novel hemispheric image formation: concepts and applications" published in "Proc. SPIE 6994, Photon Management III, 699406 (Apr. 25, 2008)". The software can create different distortions on images, including different pre-set distortions, non-linear scaling distortions, or any customized distortions. However, the software is not for panoramic image distortion processing, and it cannot transform a panoramic image with a new distortion profile to be optimized for distortion processing algorithms. It cannot transfer panoramic image distortion to a non-linear scaling distortion to emphasize important areas in an image either. Finally, it cannot be integrated into a panoramic image processing pipeline.

BRIEF SUMMARY OF THE INVENTION

To overcome all the previously mentioned issues, embodiments of the current invention propose an image distortion transformation method to transform images captured by different imagers to be optimized for distortion processing algorithm. This allows an image distortion processing algorithm to process images captured by different imagers. Here, the imagers include, but are not limited to, narrow-angle lenses, wide-angle lenses, fisheye lenses, panomorph lenses, multiple-lens systems, catadioptric systems, panoramic images generators by image stitching or any image processing units, or the like. The image distortion processing algorithm is used to process image distortion for image display or any further image processing algorithm. The distortion processing algorithm can be implemented by software or hardware on different platforms, including, but not limited to, a computer, smartphone, tablet, Field-Programmable Gate Array (FPGA), Application-Specific Integrated Circuit (ASIC), System on Chip (SoC), or the like. The image distortion transformation method is used to transform the original image to an image with any kind of distortion profile already supported by the image distortion processing unit. This image distortion transformation method can be implemented by software or hardware on different platforms, including, but not limited to, a computer, smartphone, tablet, FPGA, ASIC, SoC, or the like. This method also can be implemented by an optical system or any kind of system or associated devices. This image distortion transformation method can be implemented at different places, including, but not limited to, cameras, image capture devices, media servers, client computers, display devices, image processing algorithms, or a cloud system.

More particularly, in at least some embodiments of the present invention, a panoramic original image captured by a panoramic imager is transformed to an image with a well-known distortion profile, which is already supported by the distortion processing algorithm. The distortion processing algorithm can process distortion according to this supported distortion profile.

To optimize the image storage, transmission, resolution, quality or display, an efficient approach is to allocate more pixels to areas of interest in the image. More particularly, in at least some embodiments of the present invention, a target distortion profile is designed to increase the number of pixels occupied by an area of interest and decrease the number of pixels occupied by less important contents. The areas of interest have higher resolution (or pixel density) than less important contents. The distortion transformation method can transform the original image to a transformed image with an appropriate profile before the image is saved, transmitted, analyzed, processed, or displayed. The distortion transformation method can vary the magnification across the image and is not a linear scale of the original image. In this way, the important image areas are emphasized while the image size may be kept the same. In some embodiments, this invention can be used to scale down the image while keeping more pixels in areas of interest than the other part of the image. In some other embodiments, this transformation can be done dynamically according to the application requirements in real-time.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
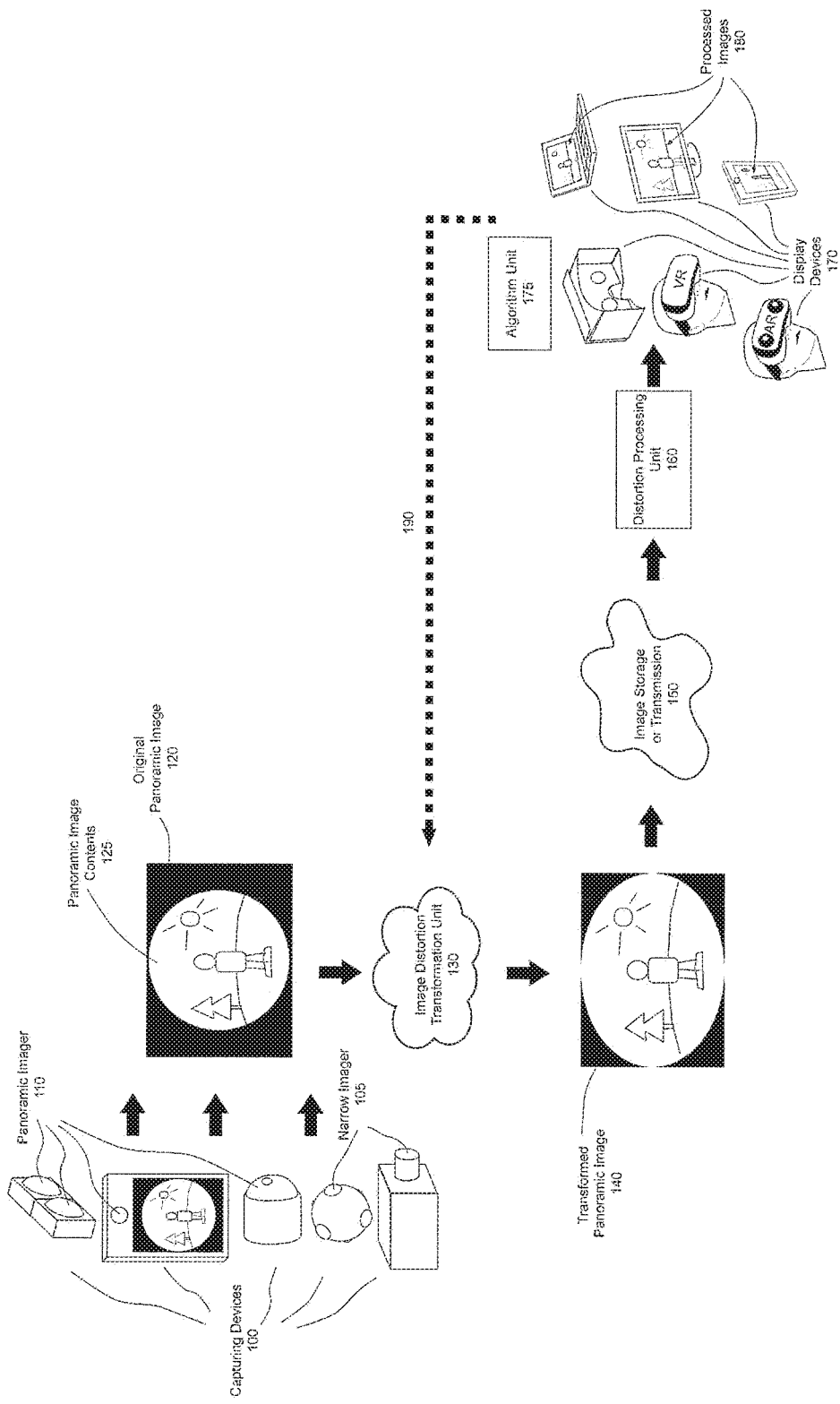
FIG. 1 is a schematic of the image transformation process to transform an original panoramic image to a transformed panoramic image with a target distortion profile known to the distortion processing unit.

FIG. 1 shows a schematic of the image distortion transformation method to transform a panoramic image from a panoramic imager to an image with target distortion profile. A capturing device 100 is preferably built with a panoramic imager 110. Alternatively, the capturing device 100 could be built with one or more narrow-angle imagers 105. The capturing device 100 may be any apparatus on which a panoramic imager could be added to add a panoramic imaging feature, including for example but in no way limited to, a mobile phone, tablet, car, robot, TV, router, GPS unit, Internet box, home surveillance camera, security camera, automotive camera, endoscope, or the like. When the panoramic imager 110 is integrated into the capturing device 100, this device is able to capture an original panoramic image 120.

Here, the panoramic imager 110 is any device capable of capturing images or parts of images from a wide-angle panoramic environment. The resulting panoramic environment preferably produces a field of view of about 120° or larger. Some examples of a panoramic imager 110 that can be used in the process are, but in no way limited to, wide angle lenses, catadioptric imagers, multiple narrow field of view cameras, computer generated panoramic images, and the like.

The original panoramic image 120 is the output image of capturing devices 100. The panoramic image 120 contains panoramic image contents 125. There is some original image distortion in the panoramic image contents 125. When the panoramic image distortion processing unit 160 does not know the distortion profile in the original panoramic image 120, the image distortion cannot be readily processed. Embodiments of the present invention propose to add an image distortion transformation unit 130 to transform the original panoramic image 120 to an image with a target distortion profile, which is known by the distortion processing unit. In this way, the distortion in the original panoramic image 120 can be optimized for the distortion processing unit 160.

Both the original panoramic image 120 and transformed panoramic image 140 can be any kind of panoramic image, including, but not limited to, circular or elliptical projected image, perimeter projected image, non-linear scaled image, wide-angle image with continuous, discontinuous, symmetric, or asymmetric or any other projection.

The original panoramic image 120 is the input image of image distortion transformation unit 130. The image distortion transformation unit 130 can be implemented by software or hardware. It can be implemented on any platform, including but not limited to, computer, smartphone, tablet, FPGA, ASIC, SoC, or the like. It can also be implemented by optical systems or any kind of systems or associated devices. This method can be implemented at different places, including, but not limited to, cameras, image capture devices, media servers, client computers, panoramic display devices, panoramic image processing algorithms, or cloud systems. In a way that will be further explained with respect to FIG. 2, the image distortion transformation unit 130 outputs transformed panoramic image 140. The transformed panoramic image 140 contains a target distortion profile.

More particularly, in at least some embodiments of the present invention, there exist some public distortion profiles for panomorph images, a kind of panoramic image created by panomorph imager which creates a zone of interest. The panomorph distortion processing software or hardware contain these public distortion profiles and can process any image mapped using these public distortion profiles. The distortion transformation method proposed in this invention transforms the original panoramic image to a transformed image with one of the public panomorph distortion profiles. In this way, panomorph distortion processing software or hardware can process distortion of any original panoramic images after the distortion transformation unit.

Before displaying or processing in an algorithm unit the panoramic image, the distortion in a transformed panoramic image 140 needs to be processed by a distortion processing unit 160. The transformed panoramic image 140 can be directly inputted to algorithm unit 175 or to distortion processing unit 160. Alternatively, the transformed panoramic image 140 can be outputted through image storage or different transmission ways 150, including, but in no way limited to, transfer of digital images over the Internet, transfer via TCP-IP protocol, USB, Firewire, memory, socket, transfer using a physical medium as a floppy disk, a laser disk, a magneto disk, a USB drive, a hard drive, or transfer of the image through physically printing the image and then scanning it back into a digital file, and the like. When the image is transmitted, it can be done internally inside a device or externally to another device.

Because the distortion processing unit 160 knows the target distortion profile in the transformed panoramic image 140, it can process the distortion and produce processed images 180.

The processed image 180 can be displayed on display devices 170. The display devices 170 can be anything displaying in part or in full the result of the distortion processing unit, including but in no way limited to, a computer or TV screen, a mobile phone, a tablet, a virtual reality (VR) headset, an augmented reality (AR) headset, a projector, or the like. In addition, the processed image 180 or the transformed panoramic image 140 can also be used inside a further algorithm unit 175 that further processes the processed image to extract relevant information, including, but in no way limited to, pedestrian detection, tracking and recognition, face detection, road lane departure, danger identification, 3D position tracking, 3D reconstruction, or the like.

In at least some embodiments of the present invention, the display devices 170 or the algorithm unit 175 can communicate via an optional link 190 with the image distortion transformation unit 130 and change the targeted distortion profile of the transformation unit in real-time depending the requirements of its application.

Figure 2:
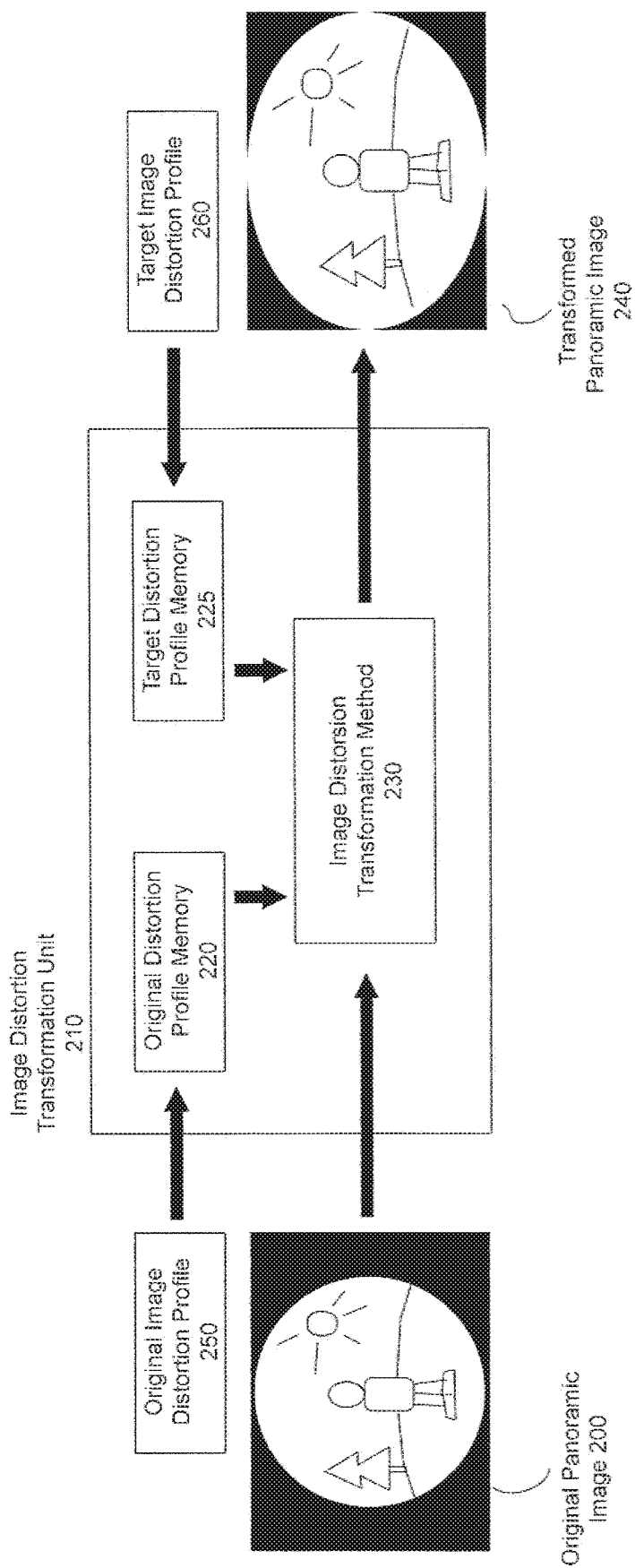
FIG. 2 is a schematic detailing the image transformation method inside the image transformation unit.

FIG. 2 shows the detailed operations of the image distortion transformation unit 130 in FIG. 1. The image distortion transformation method 230 is implemented inside the image distortion transformation unit 210. In addition, the image distortion transformation unit 210 also contains the original distortion profile memory 220 and the target distortion profile memory 225. The original image distortion profile 250 and the target image distortion profile 260 are saved in these two memory units respectively. The image distortion transformation method 230 makes use of original image distortion profile and target image distortion profile to transform the original panoramic image 200 to a transformed panoramic image 240 which is distorted according to the target distortion profile. The image distortion transformation method 230 can include, but is not limited to, pixel mapping, interpolation, filtering, or different image processing algorithms.

The original panoramic image 200 is the input image of the image distortion transformation method 230. Each different original panoramic image 200 can contain a different original image distortion profile 250, which is created by different panoramic imagers. The image distortion transformation method 230 needs to know the distortion profile of the original panoramic image 200. The original image distortion profile 250 can be inputted to the original distortion profile memory 220 from some internal or external sources, including but not limited to, a manual selection from a list of pre-saved image distortion profiles from a user interface, an automatic analysis of the content of the original image including reading a marker or metadata in the original image, or automatically transmitted from the imager. In these cases, the original image distortion profile 250 is written inside the original distortion profile memory 220. In other embodiments of the present invention, as is the case with an ASIC used for a specific transformation application, the original distortion profile can be hard-written inside the original distortion profile memory 220 and cannot be adjusted.

The image distortion transformation method 230 needs to know the target image distortion profile of the output transformed panoramic image 240, which can be processed by existing distortion processing algorithms. The target distortion profile could be, for example, but in no way limited to, one of the several public panomorph distortion profiles. In this case, the target image distortion profile 260 can be pre-saved in the target distortion profile memory 225, as is the case with an ASIC programmed for a single specific application. In addition, the target image distortion profile 260 can also be inputted to target distortion profile memory 225 from some internal or external sources. The target distortion profile 260 can be a selection from a list of pre-saved target image distortion profiles inside the target distortion profile memory 225 or a whole image distortion profile. The sources of target image distortion profile 260 include, but are not limited to, an image distortion processing unit, panoramic image display devices, face tracking or other image processing algorithm or the like. The image distortion transformation method 230 transforms the original image to the target image with a distortion profile optimized for existing distortion processing algorithms. The output transformed panoramic image 240 with the target distortion profile can later be processed by existing distortion processing algorithms. As a result, without any modification or updating to the distortion processing unit, the distortion processing unit can process any panoramic images after the image distortion transformation method 230.

Both the original image distortion profile 250 and the target image distortion profile 260 can be static distortion profiles. In some embodiments of the present invention, they also can be dynamic distortion profiles. Original image distortion profile 250 can be, for example, but in no way limited to, updated in real-time when the distortion profile of the original panoramic image 200 changes with time for dynamic panoramic imager. In other embodiments, target image distortion profile 260 can be, but in no way limited to, updated to different target image profiles required by application.

Figure 3:
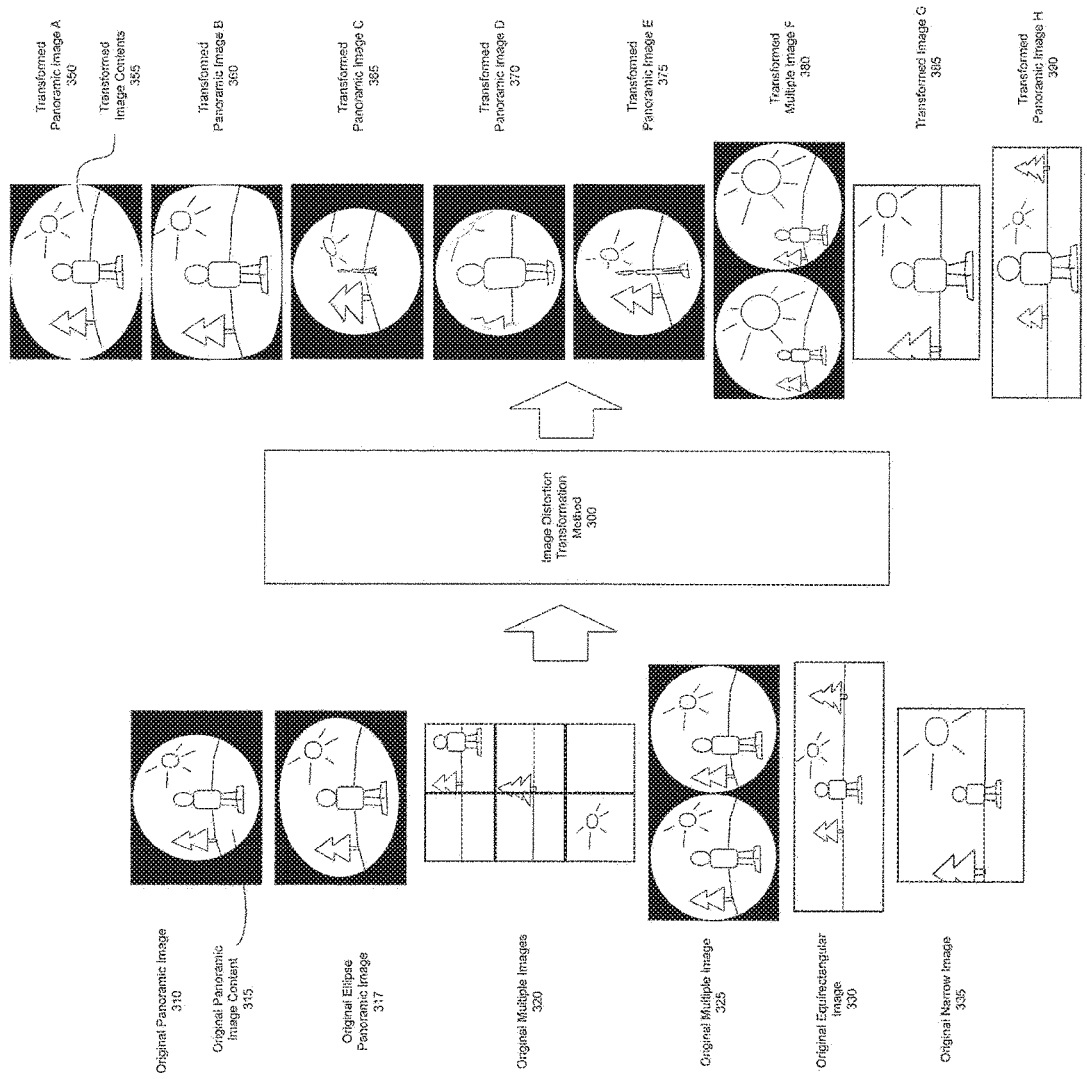
FIG. 3 shows multiple examples of original image formats and multiple examples of transformed images.

Several examples of original images and transformed images are shown at FIG. 3. The original panoramic image of image distortion transformation method 300 can be a circular panoramic image 310 or an elliptical panoramic image 317. In some others embodiments of the present invention, the image distortion transformation method 300 takes original multiple images from multiple narrow images 320 or original multiples images from multiple panoramic images as input and stitches them into a single or dual panoramic image with a target transformed distortion profile. In some other embodiments of the present invention, the input can also be an original equi-rectangular image 330 or a single narrow image 335.

Through image distortion transformation method 300, the output transformed panoramic image can have different target distortions. Some examples of output transformed panoramic images are as 350, 360, 365, 370, 375, 380, 385 and 390. After transformation, more pixels of information are recorded inside areas of interest. In cases where the total image size is reduced, the present invention allows retention of all the original information in the areas of interest.

As a first example, some fisheye or panomorph imagers create images with original panoramic image contents 315 only in a central disk area, such as in original panoramic image 310. The image is black outside the original panoramic image content disk. With rectangular image files, which are outputted by an image sensor with 16:9 or 4:3 aspect ratio, the black boundaries are even larger compared to the original image content disk. In this kind of image, the black boundaries are not useful. When the black boundaries are narrowed and occupy fewer pixels, the useful image contents will occupy more pixels and have higher resolution.

A simple distortion profile transformation is to stretch the circular area with image contents to an elliptical area, as in transformed panoramic image A 350. Compared with original panoramic image contents 315, transformed image contents 355 occupy more pixels in the image and there are fewer black background pixels. More sophisticated distortion profiles can also be applied, including, but not limited to, super-elliptical shapes, as in transformed panoramic image B 360, or non-linear planispheric projections, as in transformed panoramic image H 390. When a panoramic image is transformed in this way before it is stored or transmitted, more image storage or transmission resource can be used on important contents instead of useless black content.

As another example, the image display software or hardware can require the image distortion transformation method 300 to increase resolution of an area of interest when a user or device wants to zoom in the area. Compared with the digital zoom on a degraded image after image storage or transmission, better image quality can be achieved when resolution is increased by the image distortion transformation method 300 before image storage or transmission. The image distortion transformation method 300 can increase resolution at some positions, as in transformed panoramic image C 365 with edge magnification, transformed panoramic image D 370 with central magnification, and transformed panoramic image E 375 with mid-zone magnification. The exact position of the area of interest is chosen according to the requirement from a user or an application.

As another example, the image distortion processing algorithm is implemented by hardware. With this specific hardware, only circular symmetric distortion profiles are supported. When the original panoramic image is without rotational symmetry as in original ellipse panoramic image 317, the image distortion transformation method can transform the image to a transformed image with rotationally symmetric distortion profile.

As another example, the target distortion profile could be any kind of projection distortion which can be processed by image distortion processing unit. The transformed panoramic image could be elliptical panoramic image 350, super-elliptical 360, circular panoramic image 365, 370 and 375, or parametric projected panoramic image 390. In most embodiments according to the current invention, the field of view of the original image and the field of view of the transformed image are similar. Alternatively, the transformed panoramic image could also be a dewarped part of the full image in areas of interest having a smaller field of view as in transformed image F 380. More particularly, the case of transformed image F at 380 shows that in some embodiments of the current invention, keeping the full panoramic view by compressing the rest of the image is not mandatory and we could combine this processing that creates a zone of increased resolution with a cropping of the other, less important, part of the image if required by the application.

As another example, when the input image is original narrow image 335 with a specific distortion profile, the output transformed image G 385 can also be narrow angle with a different distortion creating an area of interest.

As another example, when the input image is original multiple images 325 as in the case of stereoscopic panoramic imaging, the output can be transformed multiple image F 380 to allow displaying a different transformed image to each eye after processing while increasing the number of pixels in the area of interest.

Figure 4:
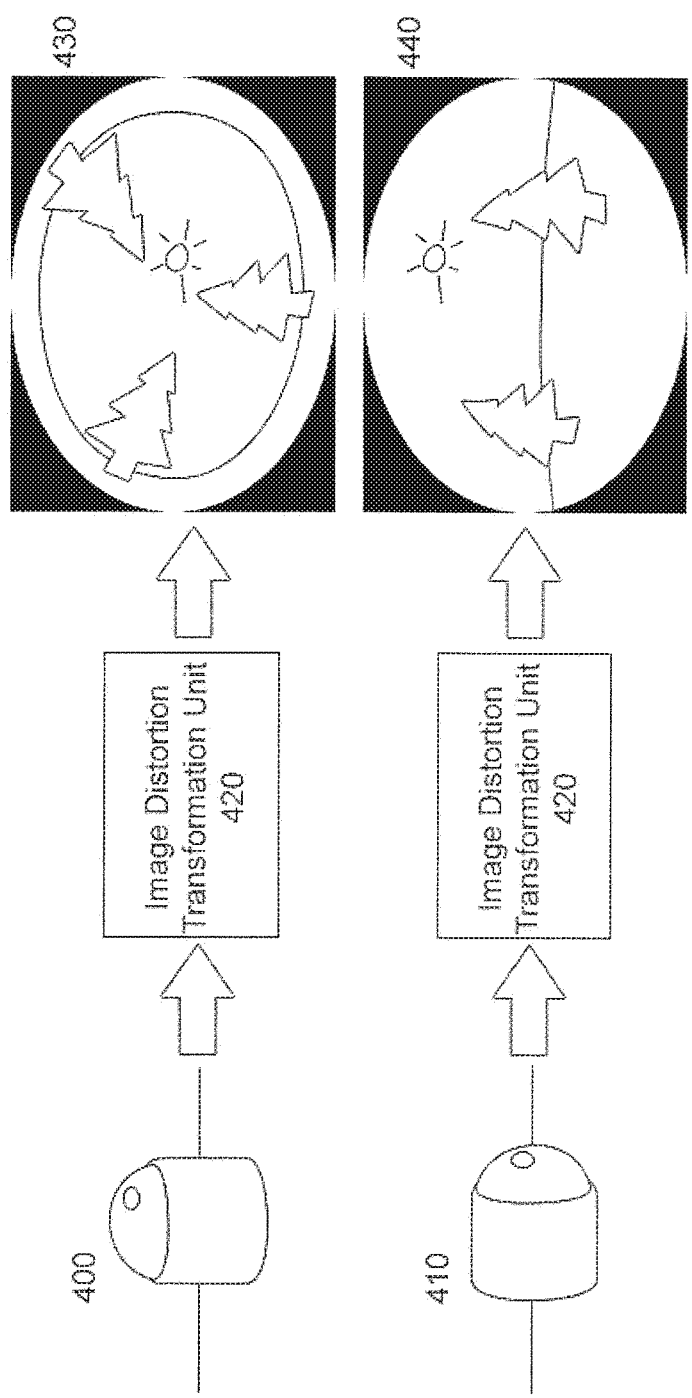
FIG. 4 is an example embodiment of the present invention where the selection of the transformed image distortion profile is made according to some parameters of the original panoramic imager.

FIG. 4 shows an example embodiment of the present invention where the selection of the output transformed image distortion profile is made according to some parameters of the original panoramic imager. In at least some embodiments of the present invention, the target distortion profile of the image distortion transformation process from FIG. 3 can be a dynamic distortion profile required by the application and the target distortion profile can be changed in real-time according to any parameter from the original image or the imager. These parameters include, but are in no way limited to, device orientation, device position or altitude from a GPS device or the like, date and time, surrounding environmental conditions including weather or imaging underwater or user selection. As one specific example, in no way limiting the scope of the invention, the distortion transformation method can use different target distortion profiles for different orientations of the capturing device. When the panoramic imager 400 faces down or up, the image contents on the boundary are more important because they are the objects around camera. In this case, the image distortion transformation unit 420 can transform the original panoramic image to transformed panoramic image 430 with higher resolution toward the edges of the image content.

Alternatively, when the panoramic imager 410 faces front, the image distortion transformation unit 420 can transform the original panoramic image to the transformed panoramic image 440 with higher resolution in the central area, which contains objects in front of camera.

Figure 5:
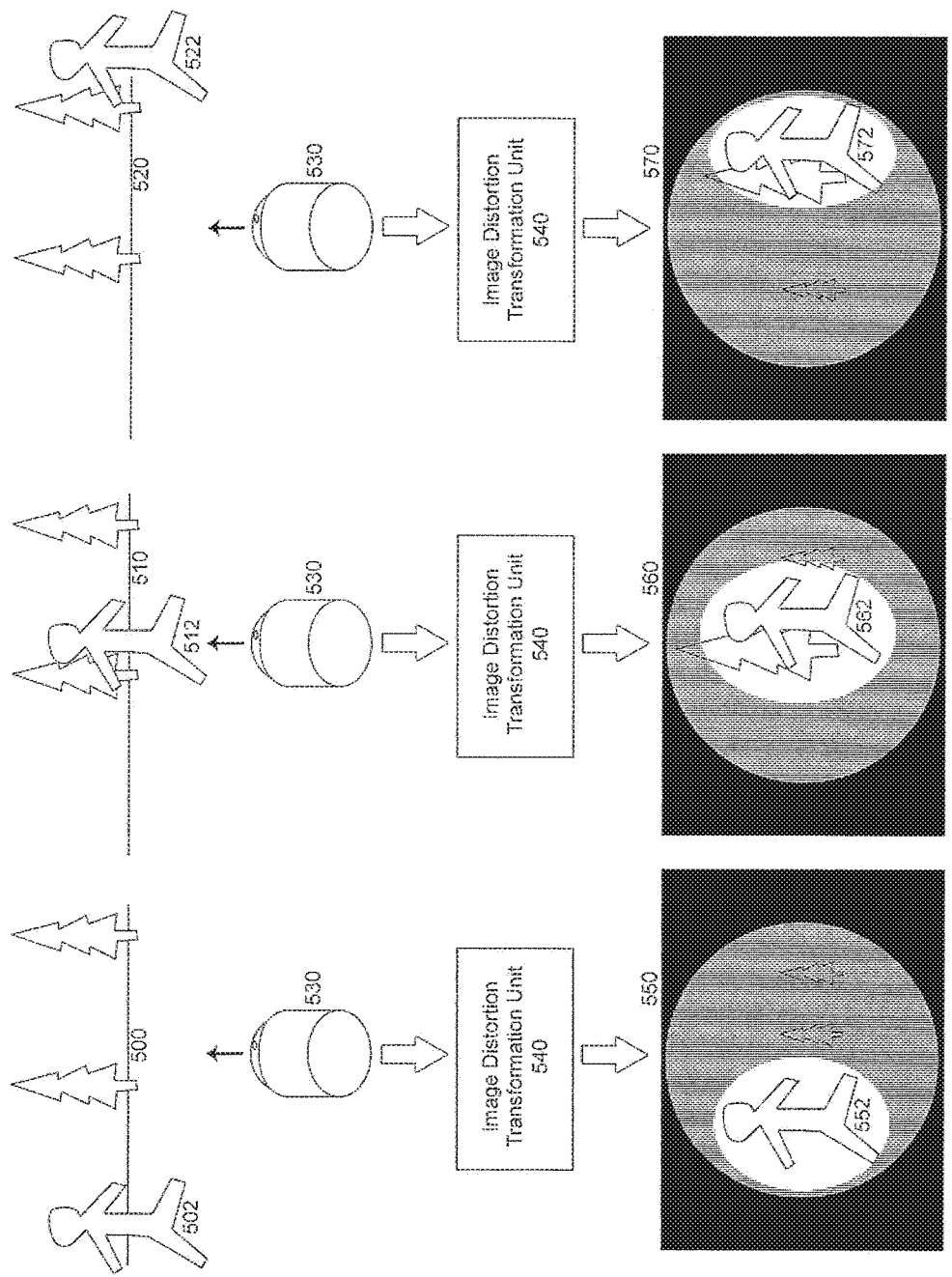
FIG. 5 is an example embodiment of the present invention where the selection of the transformed image distortion profile is changed dynamically according to variations in the image content of the original panoramic image.

FIG. 5 shows another example embodiment of the present invention where the target distortion profile is dynamically adjusted according to the scene content. The adjustment of the distortion profile can be from any source, including a user manually moving the area of interest or an algorithm unit doing specific object recognition or face tracking. In the example shown, there is a person moving in the field of view of the panoramic imager and the area of interest follows him. At first, the person 502 is on the left of the object scene 500 imaged by the panoramic imager 530. The image distortion transformation unit 540 is consequently configured to create an area of interest with higher magnification 552 in the left part of the image 550, while still keeping the full panoramic view by compressing the rest of the image. At a later time, the person 512 is now in the center of the object scene 510 imaged by the same panoramic imager 530. The image distortion transformation unit 540 is consequently configured to create an area of interest with higher magnification 562 in the central part of the image 560, while still keeping the full panoramic view by compressing the rest of the image. At an even later time, the person 522 is on the right of the object scene 520 imaged by the same panoramic imager 530. The image distortion transformation unit 540 is consequently configured to create an area of interest with higher magnification 572 in the left part of the image 570, while still keeping the full panoramic view by compressing the rest of the image.

Figure 6:
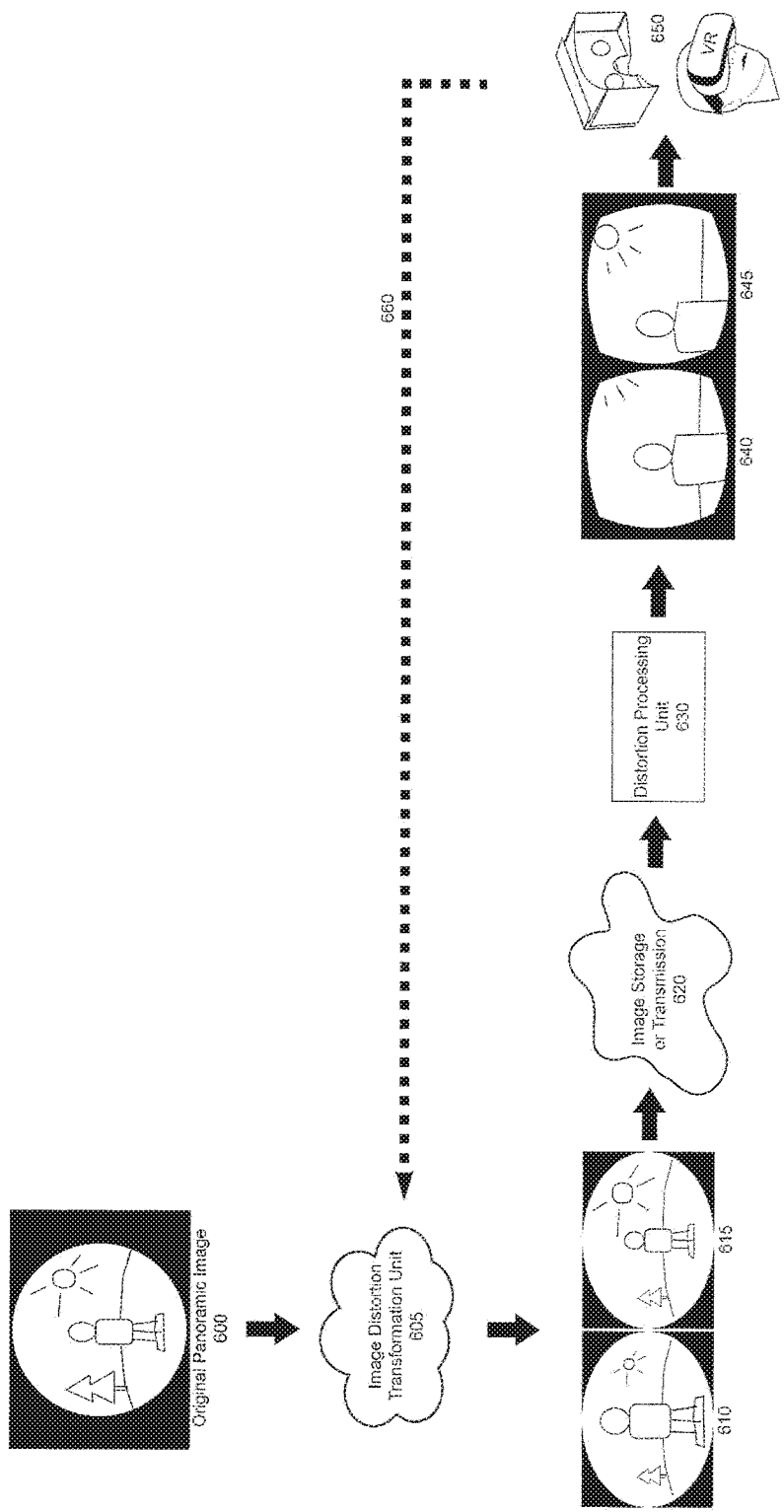
FIG. 6 is an example embodiment of the present invention where the image transformation unit generate multiples transformed images from an original panoramic image, each having a different distortion profile for a given application.

FIG. 6 shows an example embodiment of the present invention where the image distortion transformation unit 605 outputs multiple transformed images from the same original panoramic image 600. Alternatively, in another embodiment according to the present invention, the multiple transformed images could also originate from multiple original panoramic images as in the case of stereoscopic vision. In this specific example, in no way limiting the scope of the present invention, there are two transformed images 610 and 615, each having a different area of interest. The image on the left 610 has more pixels in the area of interest in the center of the image while the image on the right 615 has more pixels in the area of interest at the right of the image. These multiple transformed images are then stored or transmitted at 620 to be used by the image distortion processing unit 630. When the image is transmitted, it can be done internally inside a device or externally to another device. After distortion processing, two processed images 640 and 645 are outputted, each image showing the part of the image where the area of interest was in the transformed images 610 and 615. These processed images 640 and 645 are then used inside a single or multiple viewing devices 650. These devices could be, for example, a virtual reality viewing apparatus. In at least some embodiments of the present invention, there is also an optional communication link 660 between the viewing device 650 and the image distortion transformation unit 605, allowing the viewing device to modify, in real-time, the position and size of the area of interest according to the required application.

Figure 7:
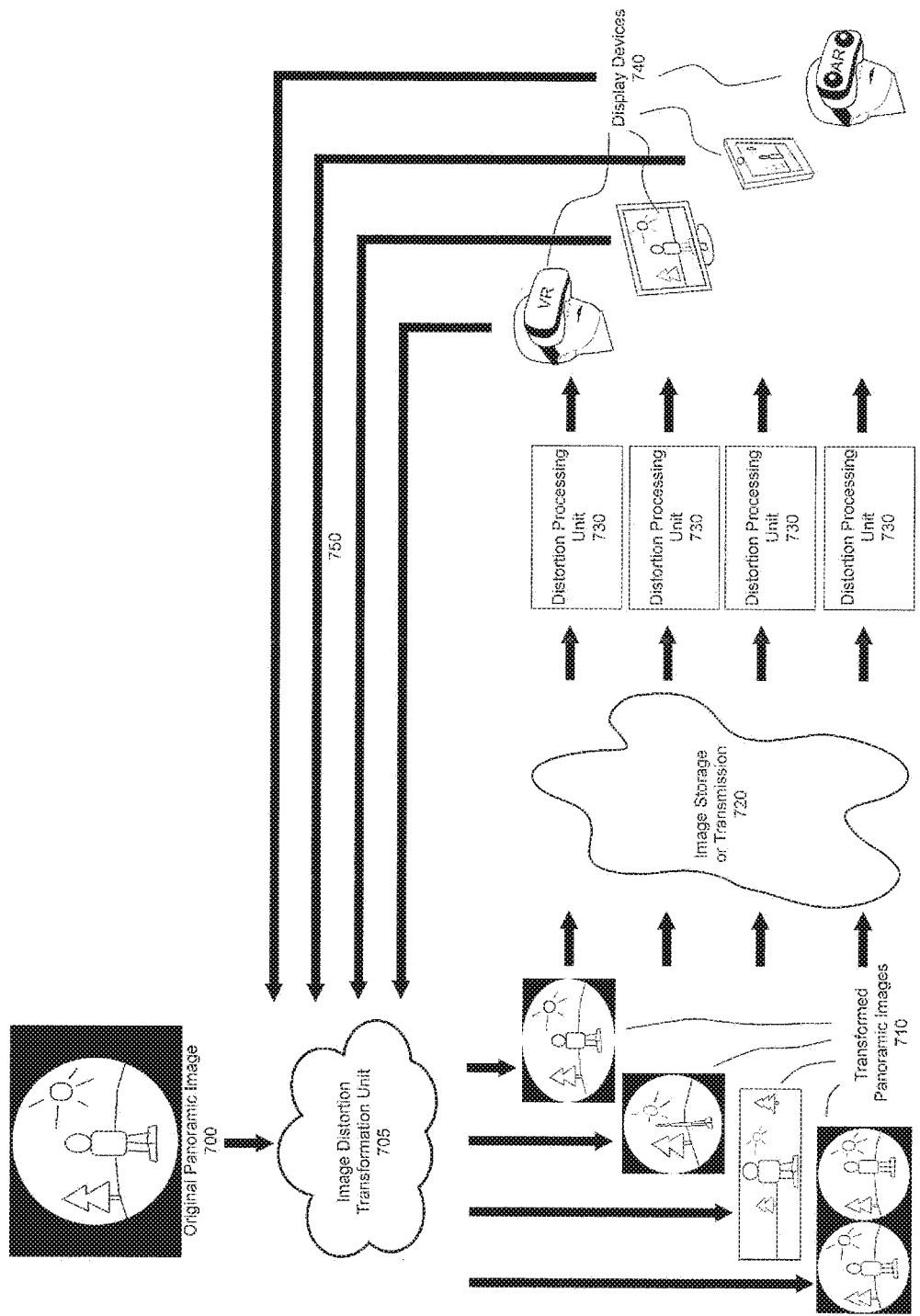
FIG. 7 is an example embodiment of the present invention where the image transformation unit generate multiples transformed images from an original panoramic image, each having a different target distortion profile inputted from different devices having different applications.

FIG. 7 shows an example embodiment of the present invention where the image distortion transformation unit 705 outputs multiple transformed images 710 from the same original panoramic image 700. The output images may have any output transformed distortion according to the present invention. The target transformed image distortion profile is configured according to the requirements of the application and transmitted to the image distortion transformation unit 705 via the communication link 750. The transformed images 710 are then stored internally or transmitted at 720 to a distortion processing unit 730. When the image is transmitted, it can be done internally inside a device or externally to another device. The output from this distortion processing unit 730 is the multiple display devices 740. According to their application, the display devices 740 request, in real-time, the exact transformed distortion images to the image distortion transformation unit 700 via the communication link 750. Each different display device can have a different area of interest or a different transformed image distortion profile.

Figure 8:
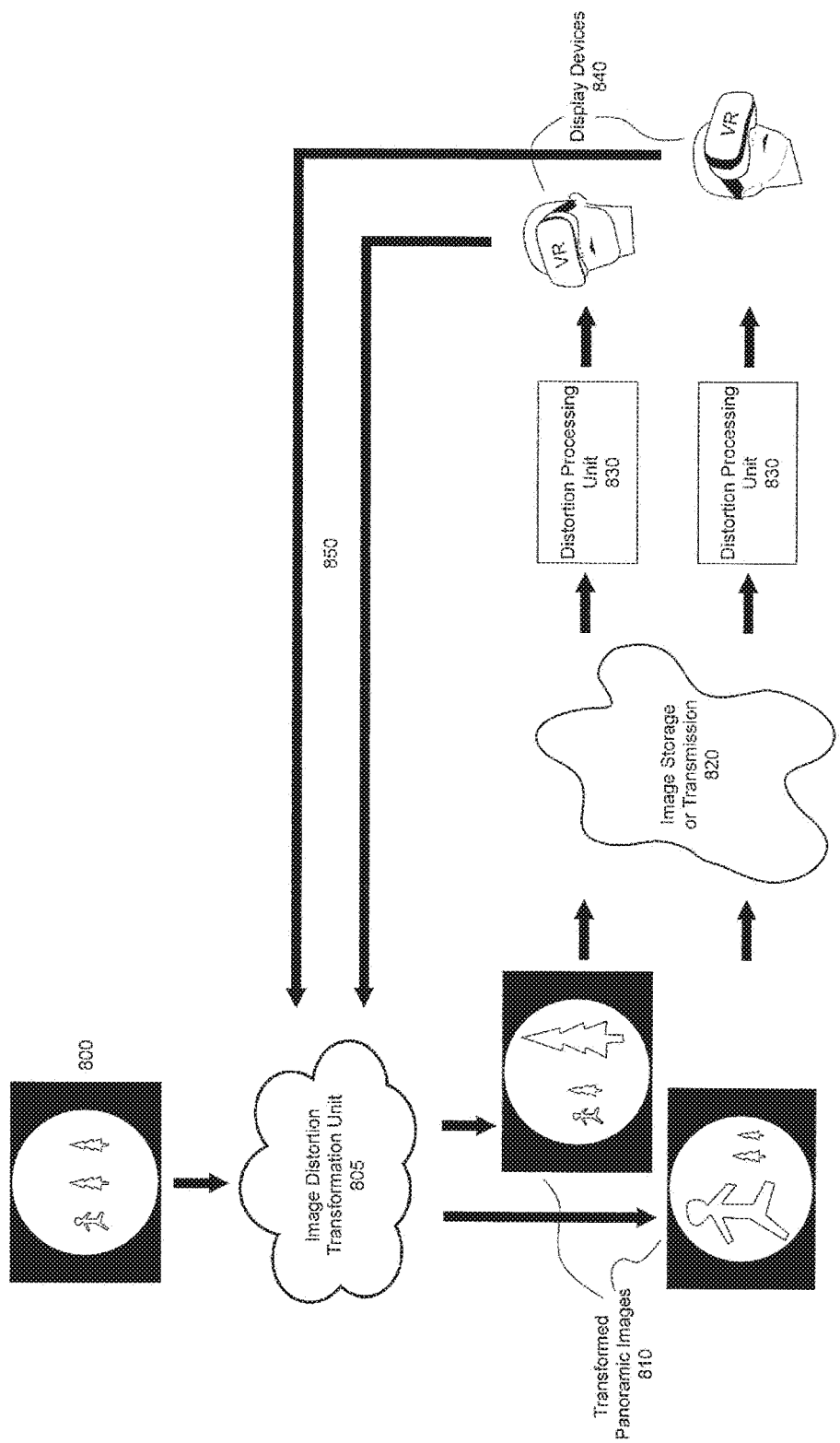
FIG. 8 is an example embodiment of the present invention where the image transformation unit generates a transformed image from an original panoramic image, the transformed image changing in real-time the target distortion profile inputted from the display device depending on the location of the areas of interest needed for its application.

FIG. 8 shows an example embodiment of the present invention where the image distortion transformation unit 805 continuously generates transformed panoramic images 810 from an original panoramic image 800 and outputs them to an image storage or transmission 820 to be used in a distortion processing unit 830. When the image is transmitted, it can be done internally inside a device or externally to another device. The distortion processing unit 830 receives a transformed image containing the full panoramic content, or a part of the panoramic content with larger field of view than what is required to be displayed. The distortion processing unit 830 extracts and dewarps a region of the image, centered on the areas of interest of the panoramic image, requested by the display devices 840. These display devices 840 display the dewarped view of the image centered on the areas of interest. When the display devices require a new area of interest, as for example the rotation of the head of a user using a virtual reality display device, the display devices 840 communicate with the image distortion transformation unit 810, via the communication link 850, in order to have a new transformed panoramic image 810 with this new area of interest. This process can take some time because of latency between the display devices and the image distortion transformation unit. However, thanks to the present invention creating transformed images still having the full panoramic content in the images, or a part of the panoramic content with larger field of view than what is required to be displayed, with lower resolution outside the areas of interest, the distortion processing unit 830 can instantaneously dewarp the content of the new area of interest and display the result in the display devices with a lower resolution. After this latency period is over, the distortion processing unit finally receive the transformed images with the new target distortion profile having the maximum resolution in the new area of interest. The resulting dewarped view displayed in the display devices 840 is improved from the lower resolution view to the maximum resolution view. Furthermore, in some embodiments of the present invention, only the difference between two transformed images from the image distortion transformation unit 805 are transmitted or stored, optimizing the storage or transmission and reducing the latency of the system.

All of the above are figures and examples of specific image distortion transformation units and methods. In all these examples, the imager can have any field of view, from very narrow to extremely wide-angle. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An image distortion transformation method for transforming multiple original images by an imager, wherein each original image has an original distortion profile, to multiple transformed images optimized for a distortion processing unit, the method being used to stitch the multiple transformed images into a stitched image with a stitched image distortion profile, the method comprising:
   a) inputting the multiple original images from the imager into the transformation unit;
   b) inputting the multiple original image distortion profiles into the original distortion profile memory of the transformation unit;
   c) inputting multiple target distortion profiles into the target distortion profile memory of the transformation unit, at least one of the multiple target distortion profiles being different from their corresponding multiple original distortion profiles;
   d) transforming the multiple original images into multiple transformed images by transforming the distortion profile of each of the original images from their original image distortion profile to their target image distortion profile, at least one of the multiple transformed image not being a linear scale of the multiple original image;
   e) stitching the multiple transformed images into a stitched image with a stitched image distortion profile; and
   f) outputting the stitched image from the transformation unit.

2. The image distortion transformation method of claim 1, wherein an area of interest in at least one of the multiple original images is adjusted dynamically according to moving content inside the original image.

3. The image distortion transformation method of claim 1, wherein an area of interest in at least one of the multiple original images is adjusted dynamically according to either an application requirement, a user selection, an algorithm unit selection or a display device selection.

4. The image distortion transformation method of claim 1, wherein either at least one of the multiple target distortion profiles or the stitched image distortion profile is created from a combination of at least two of an application requirement, a user selection, an algorithm unit selection or a display device selection.

5. The image distortion transformation method of claim 1, wherein at least one of the multiple original images from the imager is a panoramic image.

6. The image distortion transformation method of claim 1, wherein at least one pair of the multiple original images and their corresponding multiple transformed images have a similar field of view.

7. The image distortion transformation method of claim 1, wherein at least some of the multiples original images from the imager have a different field of view from each other's, the different fields of view ranging between narrow to wide-angle.

8. The image distortion transformation method of claim 1, wherein the imager is a multiple-lens system.

9. The image distortion transformation method of claim 1, wherein at least one of the multiple target distortion profile is selected by the transformation unit according to a parameter of the imager.

10. The image distortion transformation method of claim 1, wherein the stitched image is outputted to a processing unit.

11. The image distortion transformation method of claim 1, further comprising a display device, wherein the stitched image distortion profile is transmitted from the display device to the transformation unit.

12. The image distortion transformation method of claim 1, wherein the stitched image is outputted to a display device, the method further comprising:
   g) adjusting, by the display device, the inputted stitched image target distortion profile of the transformation method according to a specific application required by the display device.

13. The image distortion transformation method of claim 1, wherein at least one of the multiple original distortion profiles is inputted in the transformation unit either from a manual selection through a user interface, automatically from analyzing the content of the original image, automatically transmitted directly from the imager or hard-coded inside the original distortion profile memory.

14. The image distortion transformation method of claim 1, wherein at least one of the multiple target distortion profiles is inputted in the transformation unit either from a manual selection through a user interface, automatically transmitted from either the distortion processing unit, the display device or an algorithm unit or hard-coded inside the target distortion profile memory.

15. The image distortion transformation method of claim 1, wherein the stitched image is a single or dual panoramic image.

16. The image distortion transformation method of claim 1, wherein either any of the multiple original image distortion profiles, any of the multiple target distortion profiles or the stitched image distortion profile correspond to an area with image content without rotational symmetry.

17. An image capturing system for transforming multiple original images by an imager, each original image having an original distortion profile, to multiple transformed images optimized for a distortion processing unit, the system being used for stitching the multiple transformed images into a stitched image with a stitched image distortion profile, the system comprising a transformation unit having an original distortion profile memory and a target distortion profile memory, the transformation unit being configured to:
   a) receive multiple original images from the imager;
   b) input an original image distortion profile into the original distortion profile memory for each of the multiple original images;
   c) input a target distortion profile into the target distortion profile memory for each of the multiple transformed images, at least one of the multiple target distortion profiles being different from their corresponding multiple original distortion profile;
   d) transform the multiple original images into multiple transformed images by transforming the distortion profile of the multiple original images from their original image distortion profile to their target image distortion profile, at least one of the multiple transformed image not being a linear scale of the multiple original image;
   e) stitch the multiple transformed images into a stitched image with a stitched image distortion profile; and
   f) output the stitched image.

18. An image distortion transformation method for transforming an original image by an imager having an original distortion profile to a transformed image optimized for a distortion processing unit, the method being used for creating an area of interest in the transformed image, the method comprising:
   a) inputting the original image from the imager into the transformation unit;
   b) inputting an original image distortion profile into the original distortion profile memory of the transformation unit;
   c) inputting a target distortion profile into the target distortion profile memory of the transformation unit, the target distortion profile being different from the original distortion profile;
   d) transforming the original image into a transformed image by transforming the distortion profile of the original image from the original image distortion profile to the target image distortion profile, the transformed image not being a linear scale of the original image; and
   e) outputting the transformed image from the transformation unit;

wherein either the original image distortion profile or the target distortion profile correspond to an area with image content without rotational symmetry.

* * * * *